(12) United States Patent
Li et al.

(10) Patent No.: US 7,551,730 B2
(45) Date of Patent: Jun. 23, 2009

(54) TV SET WITH A TELEPHONE CALLS-REJECTING FUNCTION

(75) Inventors: Xiao-Guang Li, Guangdong (CN); Kuan-Hong Hsieh, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 409 days.

(21) Appl. No.: 11/309,340

(22) Filed: Jul. 28, 2006

(65) Prior Publication Data
US 2007/0116210 A1 May 24, 2007

(30) Foreign Application Priority Data
Aug. 5, 2005 (CN) .................... 2005 1 0036431

(51) Int. Cl.
*H04M 11/00* (2006.01)
*H04M 3/42* (2006.01)
(52) U.S. Cl. ............... 379/93.23; 379/93.02; 379/90.01
(58) Field of Classification Search ............. 379/93.23, 379/90.01, 93.05, 142.04, 142.17, 210.01, 379/210.02, 210.03, 93.02
See application file for complete search history.

(56) References Cited
U.S. PATENT DOCUMENTS
5,917,892 A 6/1999 Lee
5,999,602 A 12/1999 Yang et al.
6,487,422 B1 11/2002 Lee
6,597,766 B1 * 7/2003 Kawashima ............. 379/88.23
2002/0085700 A1 * 7/2002 Metcalf .................. 379/210.01
2002/0146098 A1 10/2002 Corbett et al.
2003/0142802 A1 * 7/2003 Hong et al. ............. 379/102.03
2003/0190024 A1 10/2003 Ju
2004/0116103 A1 * 6/2004 Kurihara ..................... 455/405

FOREIGN PATENT DOCUMENTS
CN 1250320 A 4/2000
CN 2523127 Y 11/2002

\* cited by examiner

*Primary Examiner*—Melur Ramakrishnaiah
(74) *Attorney, Agent, or Firm*—Winston Hsu

(57) ABSTRACT

A TV set (20) with a function of rejecting telephone calls is provided. The TV set includes a first communication port (201) and a second communication port (210) respectively connected with a telephone network (30) and a telephone (40). A switching circuit (209) is interposed between the first communication port and the second communication port; a decoder (202) is connected to the switching circuit and used for decoding a caller ID of an incoming call from the telephone network and transmitting the decoded caller ID to a display unit (205) to be displayed and to a MCU (203); and the MCU for invoking an automatically rejecting module (208) to automatically rejecting the incoming call by switching off the switching circuit according to rejection information stored in a memory. A related method is also provided.

16 Claims, 3 Drawing Sheets

TV SET WITH A TELEPHONE CALLS-REJECTING FUNCTION

TECHNICAL FIELD

The present invention relates to television sets, and particularly to a television set with a function for rejecting telephone calls.

RELATED ART

Television (TV) sets that displays caller IDs of incoming calls to viewers have been introduced into people's lives. In respect to the telephone, viewers can decide from the displayed caller IDs any incoming calls that are unwanted, hence, to ignore the unwanted incoming call.

However, the viewers cannot reject the incoming call utilizing the TV sets. A viewer has to reach the telephone and reject an incoming call using the telephone manually. Otherwise, the viewer has to endure the telephone ring until the caller hangs up.

In addition, as more and more organizations adopt telemarketing and cold calling as a tool to broadcast and collect information, unwanted calls increases in frequency. These unwanted calls may endlessly annoy viewers when enjoying a favorite program if the TV set cannot automatically reject these unwanted calls.

Therefore, there is a need for providing a TV set that can reject incoming calls automatically or under the control of viewers.

SUMMARY

A TV set with a telephone calls-rejecting function is provided in accordance with a preferred embodiment. The TV set includes a first communication port connected with a telephone network; a second communication port connected with a telephone; a switching circuit interposed between the first communication port and the second communication port; a decoder being connected to the switching circuit for decoding a caller ID of a new incoming call from the telephone network and transmitting the decoded caller ID to a MCU; and the MCU for invoking an automatically rejecting module to automatically rejecting the new incoming call by switching off the switching circuit according to rejection information stored in a memory.

An method of a TV set automatically rejecting telephone calls in accordance with another embodiment is also provided, the method comprises: a) decoding a caller ID of a new incoming call; b) determining whether the caller ID is recorded by rejection information stored in a memory; and c) rejecting the new incoming call if the caller ID is recorded by the rejection information.

Other advantages and novel features will be drawn from the following detailed description with reference to the attached drawings, in which:

DETAILED DESCRIPTION OF THE EMBODIMENT

Figure 1:
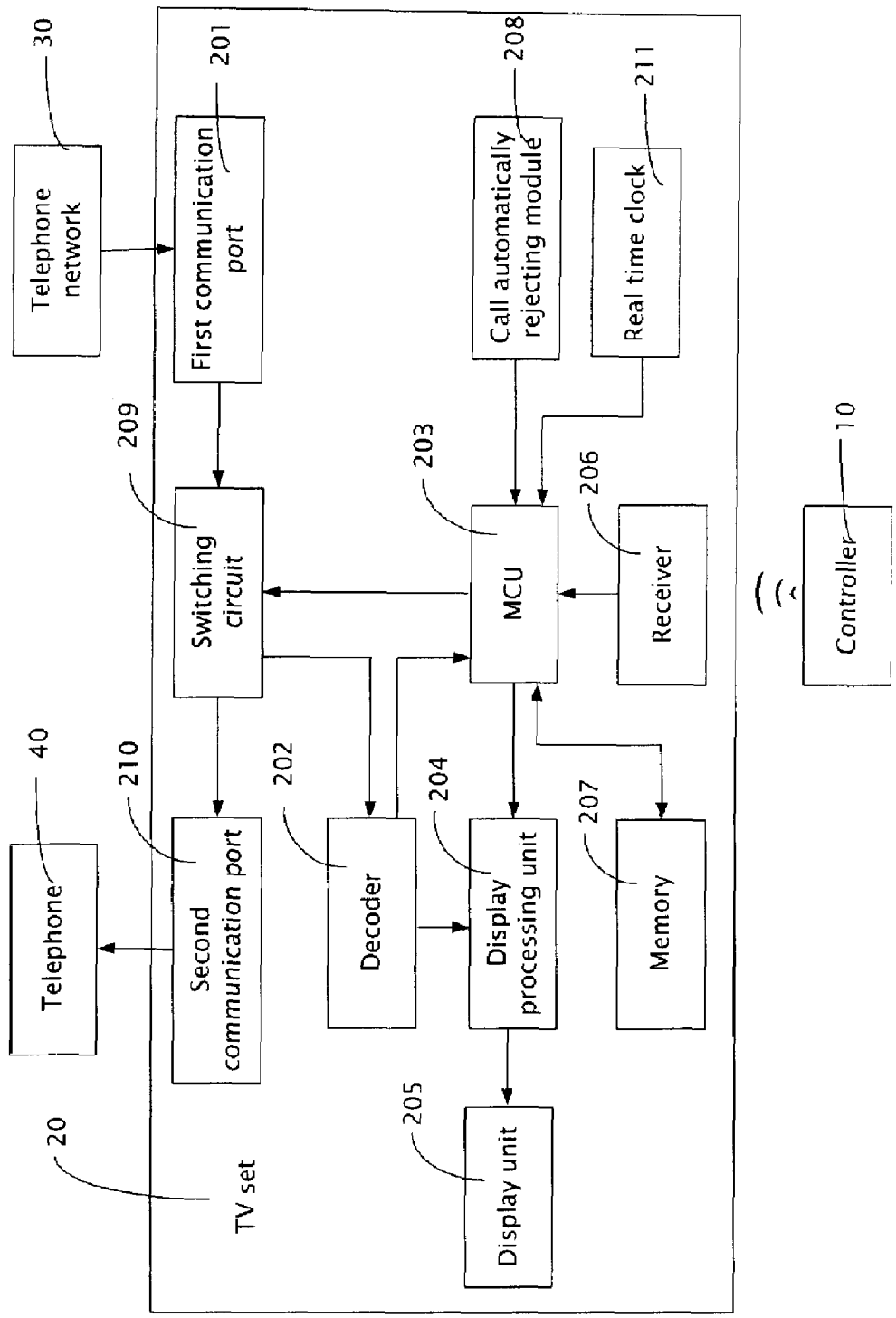
FIG. 1 depicts a schematic block diagram of a TV set with a telephone calls-rejecting function in accordance with a preferred embodiment of the present invention.

Referring to FIG. 1, a schematic block diagram of a TV set with a telephone calls-rejecting function in one embodiment is shown. The TV set 20 is equipped with a first communication port 201 and a second communication port 210 that connects with a telephone network 30 and a telephone 40 respectively. The first and second communication ports 201 and 210 co-operate and transmit communication between the telephone network 30 and the telephone 40 via a switching circuit 209 included in the TV set 20. The TV set 20 further includes a decoder 202. The decoder 202 is connected to the switching circuit 209, and is used to obtain a caller ID of a new incoming call from the telephone network 30. The decoder 202 decodes the caller ID and transmits the decoded caller ID to a display processing unit 204. The display processing unit 204 then outputs the decoded caller ID and informs a viewer of the new incoming call via a display unit 205.

If unwilling to answer the new incoming call, the viewer can utilizes a controller 10 (e.g., a remote controller) to send a reject command to the TV set 20. The reject command is received by a receiver 206 of the TV set 20 and is transmitted to a microcontroller unit (MCU) 203 via the receiver 206. The MCU 203 then switches off the switching circuit 209 in accordance with the reject command, so as to interrupt the communication between the telephone 40 and the telephone network 30. In the preferred embodiment, the switching circuit 209 is always in an "on" state when the TV set 20 is powered off or on but the MCU 203 does not control the switching circuit 209 to switch off. The controller 10 is provided with a call reject button (not shown) and a caller ID reject list preset button (not shown). The call reject button enables the viewer to produce the reject command when the new incoming call is detected, while the caller ID reject list preset button enables the viewer to preset one or more caller IDs that the viewer desires to reject. The caller ID reject list preset button sends a caller ID reject list preset signal to the TV set 20 and triggers a caller ID reject list preset interface to be displayed on the TV set 20. The viewer inputs a caller ID reject list using number keys (not shown) of the controller 10, via the caller ID reject list preset interface. The preset caller ID reject list is then stored in a memory 207 of the TV set 20 as rejection information.

In one embodiment, under control of the MCU 203, the memory 207 also registers immediate preceding reject history records of a plurality of incoming calls manually rejected by the viewer as rejection information, including caller IDs of the manually rejected incoming calls and previous rejection wait times between the incoming calls being detected and rejected.

Each of the previous rejection wait times is calculated by the MCU 203 that obtains a begin time and a rejection time of the corresponding previous rejected incoming call from a battery-driven real time clock 211. The memory 207 further stores a minimum wait time preset by the viewer. The minimum wait time is a low threshold time duration for the TV set 20 to automatically reject the new incoming call according to the immediate preceding reject history records.

Therefore, according to this embodiment, when rejecting the new incoming call using the immediate preceding reject history records, the TV set 20 first determines whether a corresponding previous reject wait time registered by the immediate preceding reject history records exceeds the minimum wait time. If not, the TV set 20 automatically rejects the new incoming call by switching off the switching circuit 209 based on the minimum wait time. If true, the TV set 20 rejects the incoming call according to the previous reject wait time.

In another embodiment, under control of the MCU 203, the memory 207 registers rejection history records of manually rejected incoming calls as rejection information, including caller IDs of the incoming calls and times in which the incoming calls were rejected. The memory 207 further stores a preset retroactive time interval and a preset count.

Each time a new incoming call is detected, the MCU 203 searches the rejection history records, and determines whether the new incoming call have been manually rejected by the viewer within the preset retroactive time interval which is traced back starting from the time the new incoming call being detected. If the new incoming call has been recorded by the rejection history records as being rejected within the retroactive time interval, the MCU 203 further compares a rejection count of the incoming call within the retroactive time interval with the preset count, and determines whether to reject the new incoming call according to the comparison. For example, if the retroactive interval is 1 hour, and the preset count is three, when a new incoming call is detected, the MCU 203 judges whether the new incoming call has been manually rejected for at least the count of three in 1 hour traced back from the time the new incoming call is detected, and automatically rejects the new incoming call if the answer is yes.

The TV set 20 further includes a call automatically rejecting module 208. The call automatically rejecting module 208 is invoked by the MCU 203 to automatically reject incoming calls based upon the rejection information described above. The decoder 202 transmits the decoded caller ID of the new incoming call to the MCU 203. The MCU 203 invokes the call automatically rejecting module 208 and first determines whether to reject the new incoming call according the preset caller ID reject list. If the caller ID of the new coming call is not included in the preset caller ID reject list and the viewer does not respond to the new incoming call, namely the viewer does not answer or reject the new incoming call, the MCU 203 then determines whether to reject the new incoming call according to the immediate preceding reject history records or according to the rejection history records, and automatically rejects the new incoming call if the new incoming call has been rejected according to the immediate preceding reject history records at least one time or if the incoming call has been rejected a number of times equal the preset count in the preset retroactive time interval according to the rejection history records.

Figure 2:
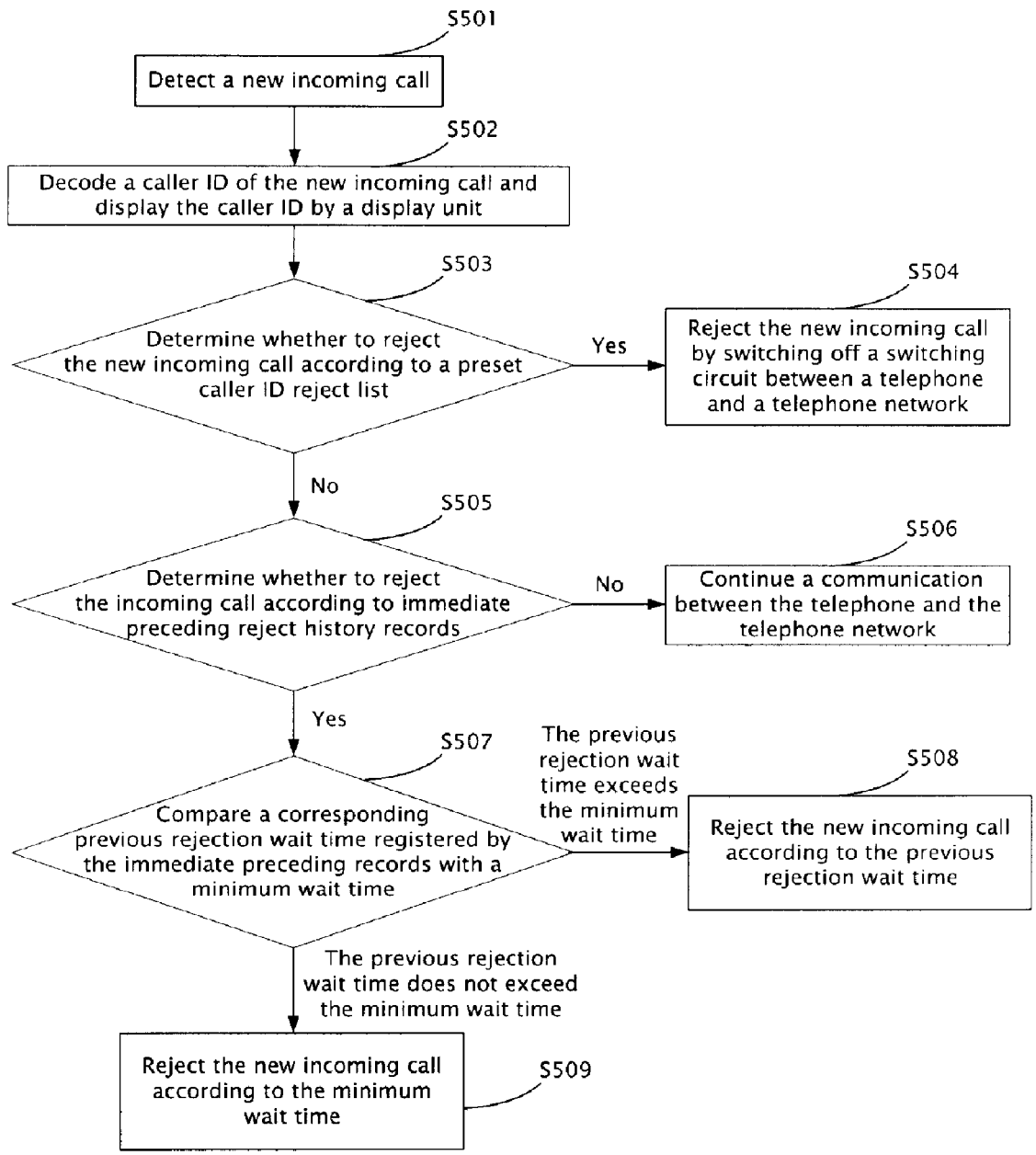
FIG. 2 depicts a schematic block diagram of the TV set with a telephone calls-rejecting function in accordance with another preferred embodiment of the invention.

Referring to FIG. 2, a flowchart of a method that the TV set 20 rejecting the new incoming call according to another embodiment is shown. First in step S501, the TV set 20 detects the new incoming call from the telephone network 30 via the communication port 201. In step S502, the decoder 202 obtains the caller ID of the new incoming call, decodes the caller ID, and transmits the decoded caller ID to the display unit 205 to display. The decoder 202 further transmits the caller ID to the MCU 203 to determine whether to reject the new incoming call based upon the rejection information stored in the memory 207 respectively.

In step S503, the MCU 203 invokes the call automatically rejecting module 208 to determine whether to reject the new incoming call according to the caller ID reject list preset by the viewer. If the caller ID of the new incoming call is included in the preset caller ID reject list, in step S504, the MCU 203 rejects the new incoming call by switching off the switching circuit 209, and the procedure ends.

If the caller ID of the new incoming call is not included in the preset caller ID reject list, and the viewer does not manually reject the new incoming call, then in step S505, the MCU 203 invokes the call automatically rejecting module 208 to determine whether to reject the new incoming call according to the immediate preceding reject history records. That is, the MCU 203 determines whether the new incoming call has been rejected at least one time manually by the viewer according to the immediate preceding reject history records.

If not, in step S506, the switching circuit 209 is kept on and the communication between the telephone 40 and the telephone network 30 continues. If true, in step S507, the MCU 203 compares a corresponding previous reject wait time registered by the immediate preceding reject history records with the minimum wait time, and determines whether to reject the new incoming call according to the previous reject wait time or according to the minimum wait time. If the previous reject wait time exceeds the minimum wait time, in step S508, the MCU 203 rejects the new incoming call according to the previous reject wait time. That is, the MCU 203 switches off the switching circuit 209 when a call duration of the new incoming call reaches a time span indicated by the previous reject wait time. Otherwise, in step S509, the MCU 203 rejects the new incoming call according to the minimum wait time.

Figure 3:
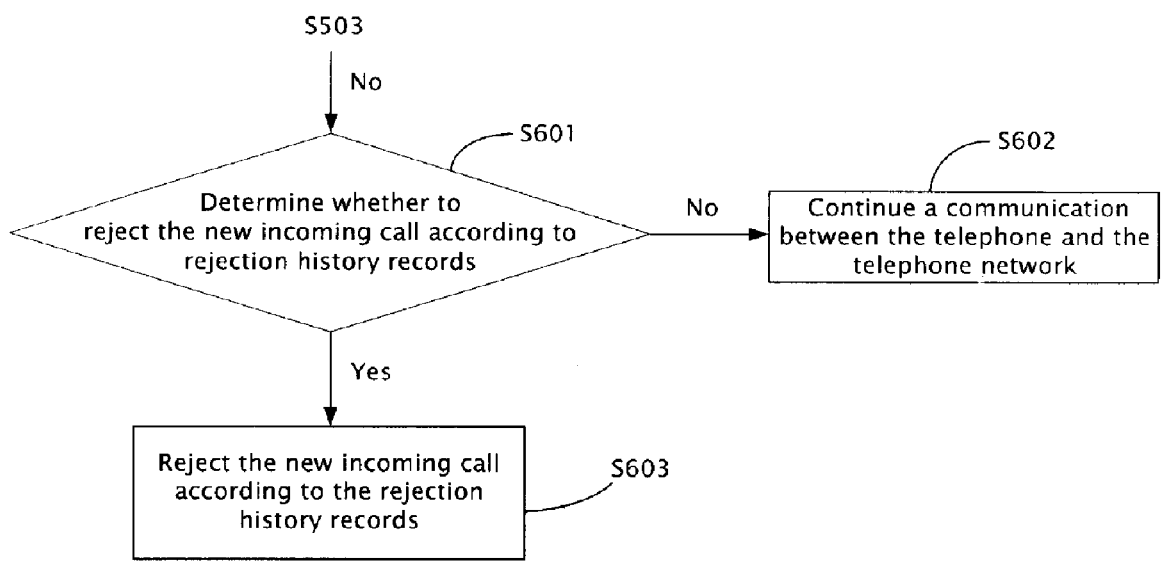
FIG. 3 depicts a schematic block diagram of the TV set with a telephone calls-rejecting function in accordance with a third preferred embodiment of the invention.

Referring to FIG. 3, a flowchart of the TV set 20 rejecting the new incoming call according to a third preferred embodiment is shown. In this embodiment, if according to FIG. 2 the caller ID of the new incoming call is not included in the preset caller ID reject list, and the viewer does not manually reject the new incoming call, in step S601, the MCU 203 invokes the call automatically rejecting module 208 to determine whether to reject the new incoming call according to the rejection history records. That is, the MCU 203 determines whether the new incoming call has been rejected manually for at least the preset count in the preset retroactive time interval traced back starting from the new incoming call being detected. If not, in step S602, the switching circuit 209 is maintained to be on and the communication between the telephone 40 and the telephone network 30 continues. If yes, in step S603, the MCU 20 switches off the switching circuit 206, thus to automatically reject the new incoming call.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A TV set for rejecting telephone calls, comprising:
   a first communication port connected with a telephone network;
   a second communication port connected with a telephone;
   a switching circuit interposed between the first communication port and the second communication port;
   a decoder being connected to the switching circuit and configured for decoding a caller ID of a new incoming call from the telephone network;
   a microcontroller unit (MCU) configured for receiving the decoded caller ID from the decoder; and
   a call automatically rejecting module connected to the MCU and being invoked by the MCU to automatically reject the new incoming call by switching off the switching circuit if the new incoming call has been rejected for at least a preset count in a preset retroactive interval starting from the new incoming call being detected.

2. The TV set as claimed in claim 1, wherein the decoder is further configured for transmitting the decoded caller ID to a display unit to display.

3. The TV set as claimed in claim 1, wherein the MCU is also configured for automatically rejecting the new incoming call if the caller ID of the new incoming call meets with a preset caller ID reject list.

4. The TV set as claimed in claim 1, wherein the MCU is further configured for rejecting an incoming call according to immediate preceding reject history records of incoming calls manually rejected by a viewer by sending reject commands using a controller.

5. The TV set as claimed in claim 4, wherein each of the immediate preceding reject history records comprising a caller ID of an incoming call and a previous rejection wait time between the incoming call being detected and rejected.

6. The TV set as claimed in claim 5, wherein the MCU is further configured for determining whether a corresponding previous rejection wait time of an new incoming call exceeds a preset minimum wait time, and rejects the new incoming call according to the corresponding previous rejection wait time if the corresponding previous rejection wait time exceeds the minimum wait time.

7. The TV set as claimed in claim 6, wherein the MCU is configured for rejecting the new incoming call according to the minimum wait time if the corresponding previous rejection wait time does not exceed the minimum wait time.

8. A method for automatically rejecting telephone calls using a TV set, comprising:
   detecting a new incoming call from a telephone network;
   decoding a caller ID of the new incoming call;
   determining whether the caller ID meets with rejection information stored in a memory, the rejection information comprising: rejection history records of manually rejected incoming calls, the rejection history records comprising caller IDs of the incoming calls and a preset count that the incoming calls be rejected in a preset retroactive interval;
   rejecting the new incoming call if the caller ID meets with the rejection information;
   detecting whether receiving a reject command if the caller ID does not meets with rejection information stored in a memory; and
   rejecting the new incoming call, and updating the rejection information according to the caller ID of the new incoming call and the time when the new incoming call is rejected if receiving the reject command.

9. The method as claimed in claim 8, further comprising the step of displaying the decoded caller ID.

10. The method as claimed in claim 8, wherein the rejection information further comprises a preset caller ID reject list.

11. The method as claimed in claim 8, wherein the rejection information further comprises immediate preceding reject history records of incoming calls that are manually rejected by a viewer.

12. The method as claimed in claim 11, wherein each of the immediate preceding reject history records comprises a caller ID of an incoming call and a previous rejection wait time between the incoming call being detected and being rejected.

13. The method as claimed in claim 12, wherein the rejection information further comprises a minimum wait time.

14. The method as claimed in claim 13, wherein the step of rejecting further comprises determining whether a corresponding previous rejection wait time of the new incoming call registered by the immediate preceding reject history records exceeds the minimum wait time, and rejecting the new incoming call according to the corresponding previous rejection wait time if the corresponding previous rejection wait time exceeds the minimum wait time.

15. The method as claimed in claim 14, wherein the step of rejecting further comprises rejecting the new incoming call according to the minimum wait time if the corresponding previous rejection wait time does not exceed the minimum wait time.

16. The method as claimed in claim 8, wherein the step of rejecting further comprises rejecting the new incoming call if the new incoming call has been rejected for at least the preset count in the preset retroactive interval traced back starting from the new incoming call being detected according to the rejection history records.

* * * * *